March 5, 1940. B. GROB ET AL 2,192,788
FILING MACHINE
Filed Sept. 13, 1933
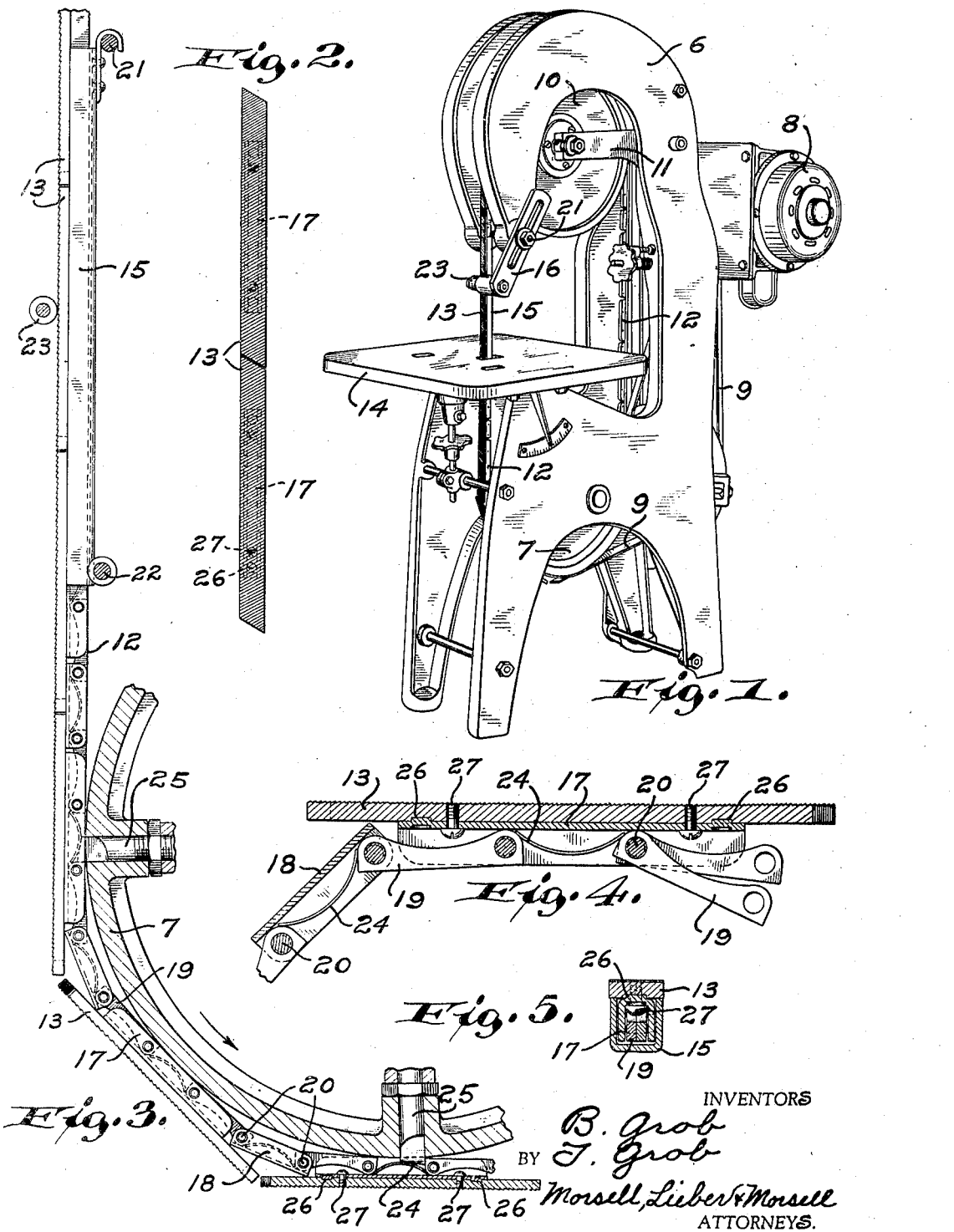

Patented Mar. 5, 1940

2,192,788

UNITED STATES PATENT OFFICE 2,192,788

FILING MACHINE

Benjamin Grob and Theodore Grob, West Allis, Wis.

Application September 13, 1933, Serial No. 689,241

19 Claims. (Cl. 29—76)

This invention relates to improvements in filing machines of the type wherein the work is subjected to the abrasive action of a continuous series of files carried by an endless chain which coacts with spaced pulleys driven so as to constantly advance the successive files in the same direction past the work.

This application is a continuation in part of the co-pending applications resulting in the Patents No. 1,949,742, issued March 6, 1934, and No. 1,958,477, issued May 15, 1934, and particularly with respect to certain claims divided out of the application resulting in the patent last mentioned.

An object of the invention is to provide an improved machine of the type wherein the successive files are most effectively guided, and in which the files are so constructed and coact with each other in a manner whereby a continuous and highly efficient abrasive surface is presented to the work.

Another object of the invention is to provide an improved file carrier chain, and simple means for effectively attaching the files to the chain without resorting to objectionable spot welding.

A further object is generally to simplify and improve the construction and operation of filing machines.

These and other objects and advantages will be apparent from the following detailed description and drawing, wherein—

Fig. 1 is a perspective view of a complete filing machine;

Fig. 2 is an enlarged front view of two of the files;

Fig. 3 is a similarly enlarged side view of a number of the files and of a piece of the carrier chain, showing portions of the chain guiding and driving mechanisms;

Fig. 4 is a further enlarged central longitudinal section through one of the files and several of the carrier chain links; and Fig. 5 is a transverse section through one of the files, chain links, and the reaction guide.

The filing machine shown in Fig. 1 in many of its details and in its mode of operation is similar to the machine of our co-pending application resulting in Patent No. 1,958,477, issued May 15, 1934. The machine comprises in general a main frame 6, a lower pulley 7 fixedly journaled in the frame and adapted to be rotated by a motor 8 through transmission mechanism 9, an upper pulley 10 adjustably supported from the frame by a lever 11, an endless chain 12 coacting with the pulleys 7, 10 and having a continuous series of files 13 attached thereto, a work supporting table 14 adjustably attached to the main frame, and mechanism including a guide 15 and steadying arm 16 for stabilizing the files and carrier chain near the table 14.

As shown in Fig. 2, the file teeth preferably extend across the file faces diagonally, and the adjacent ends of the successive files 13 are disposed diagonally in the opposite direction, across the path of travel of the file faces. This construction of the files provides an overlap of the file ends effecting an uninterrupted and smooth abrasive surface at the joints between the files whereby to reduce longitudinal vibration, and prevents thin pieces of work from entering the slight gaps at these joints.

The endless chain 12 which carries the files 13, is shown in Figs. 3, 4 and 5, and consists of main U-shaped links 17 directly attached to the files, intermediate U-shaped links 18 disposed between the main links, and sets of solid links 19 connected to the adjacent links 17, 18 by pivot pins 20. All of the links 17, 18, 19 may be formed of sheet metal, and the transverse width of the U-shaped links is less than that of the files 13 so that the U-shaped guide 15 which embraces the chain 12 at the working zone, will not project beyond the side edges of the files, as clearly indicated in Fig. 5. The U-shaped guide 15 may also be formed of sheet metal, and is detachably fixed with the main frame 6 by pins 21, 22 shown in Fig. 3; and a roller 23 carried by the end of the arm 16 is adapted to be brought in contact with the file faces in order to retain the chain 12 within the guide 15, by virtue of the adjustability of the steadying arm shown in Fig. 1.

The chain 12 is constantly maintained in stretched condition, whether in the machine or removed therefrom, by leaf springs 24 inserted between the pins 20 as shown in Fig. 3, and the solid links 19 are adapted to be engaged by driving pins 25 carried by the lower pulley 7, to engage the chain between the walls of the U-shaped links and against the trailing end of the solid links, thus providing a positive drive. The ends of the pins 20 are of reduced diameter, so that when the pins have been inserted and the springs 24 are applied, the pins 20 cannot fall out of place, and the medial portions of these pins snugly fit the openings in the solid links 19. The driving pins 25 are axially slidable to positions respectively engaging and disengaged from the file chain, and are normally urged to engage the file chain by the means of springs, not shown, which may be of any suitable form, as for instance the form shown in said co-pending application.

The rigid attachment of the main links 17 to the files 13 is accomplished as shown in Figs. 4 and 5, by providing spaced recesses in the rear of each file and by partially punching the links 17 to provide integral lug members 26 adapted to snugly engage these recesses. As clearly shown in Figs. 4 and 5, the lugs 26 are formed by locally punching spaced depressions in the rear side of each of the ductile, sheet-metal main links 17; and the lugs 26 thus produced on the front of each link 17, project forwardly a distance equal to about one-half the thickness of the main link and thus produce lugs which are adapted to resist considerable shear. The files and main links are also provided with spaced screw-threaded holes adapted to receive clamping screws 27 as shown, but these screws may be replaced by rivets. The screws 27 or rivets, which detachably connect the files 13 and main links 17, are substantially relieved from shear stresses during normal operation of the machine, by the lugs 26 which snugly engage the recesses in the files 13 and thereby definitely position the links 17 relative to the files 13 so that the latter will properly cooperate with each other and with the fixed guide 15. The solid links 19 are shaped so as to avoid interfering with the clamping screws or rivets, and the clamping members serve merely to hold the files 13 and links 17 together, while the lugs 26 take all of the shear stresses and to align the files to operate in a path of accurately predetermined width.

The mode of utilizing the improved filing machine should be readily apparent from the foregoing description, and it is to be noted that the carrier chain 12 is at all times maintained in stretched condition by the adjustable lever 11, and by the leaf springs 24. The guide 15 cooperates with the diagonal formation of the ends of the files 13 to present a smooth abrasive surface, and by making the stabilizing guide of less width than the files 13, grooves of the same width as the files but of greater depth than the file thickness, may be formed in the work. That is to say, in order that the guide may not interfere with entry of the file edges into corners of the work, it is important that that portion of the guide within the working zone, the zone occupied by the face of the work being filed, be no greater in width than the width of the files, and it will be noted that that condition prevails in the form of guide shown. The improved attachment of the files to the main links 17 with the aid of the lugs 26, insures firm connection of these elements to each other without destroying the temper of the files as is done with welding, and the files may be readily replaced when worn.

While an actual commercial embodiment of the invention has been shown and described herein, the features thereof are obviously subject to some modification without departing from the spirit of the improvement.

We claim:

1. In a filing machine, a guide fixedly supported at both ends and having elongated plane bearing surfaces on opposite sides of a central groove, a series of files of greater width than said guide each having spaced central recesses and rear side portions cooperable with said guide surfaces on opposite sides of said recesses, the adjacent ends of the successive files being disposed diagonally in one direction across said guide while the file teeth extend diagonally in the opposite direction, a main U-shaped sheet-metal link attached directly to each file and having punched integral projections of less height than the link thickness and of less width than said groove snugly engaging said recesses between said guide surfaces, other U-shaped sheet-metal links disposed between said main links and coacting with said diagonal file ends between said guide surfaces, and solid links pivotally connecting the adjacent ends of said main and other U-shaped links to provide a carrier chain movable within said groove.

2. In a filing machine, a guide fixedly supported at both ends and having elongated plane bearing surfaces on opposite sides of a central groove, a series of files of greater width than said guide each having spaced central recesses and rear side portions cooperable with said guide surfaces on opposite sides of said recesses, the adjacent ends of the successive files being disposed diagonally in one direction across said guide while the file teeth extend diagonally in the opposite direction, a main U-shaped sheet-metal link attached directly to each file and having punched integral projections of less height than the link thickness and of less width than said groove snugly engaging said recesses between said guide surfaces, other U-shaped sheet-metal links disposed between said main links and coacting with said diagonal file ends between said guide surfaces, solid links pivotally connecting the adjacent ends of said main and other U-shaped links to provide a carrier chain movable within said groove, and means for stretching said chain longitudinally to maintain said links within said groove and said file portions in contact with said guide surfaces.

3. In a filing machine the combination of a frame, a plurality of vertically spaced pulleys supported from said frame, a horizontal work table fixed on said frame at a level between said pulleys and providing a vertical opening, a carrier guided on said pulleys for movement of a portion downwardly through a working zone and through said opening in a straight line path, file elements fixed on said carrier to provide a substantially continuous filing surface in said path, and a guide extending through said opening and supported from said frame at vertically spaced points respectively above and below said table, said guide providing vertically extended surfaces supporting said carrier and files against lateral displacement, said guide within said working zone having an overall width no greater than said files.

4. In a filing machine the combination of a frame, a horizontal work table supported from said frame and providing a chain opening, a chain supported from said frame for movement of a portion of the chain downwardly through said opening in a straight line path, said chain including file elements fixed therewith to provide a substantially vertically continuous filing surface in said path, and transmission mechanism for the downward actuation of said chain portion including a power actuated element movable in the direction of chain travel and having a chain abutment portion, said chain providing complementary abutment portions engageable therewith, and means mounting said power actuated element for movement in a direction transverse to the direction of chain movement and sufficient to disengage from said complementary abutment portions.

5. In a filing machine the combination of a frame, a plurality of vertically spaced pulleys supported therefrom, a carrier guided on said pulleys for movement of a portion downwardly in a straight line path, file elements located at the front of said carrier to provide a substantially continuous front filing surface in said path and defined between two parallel laterally spaced vertical planes, the ends of adjacent file elements being mutually overlapping in a longitudinal direction in said straight line path portion, whereby to minimize the effect of the longitudinal interruption of said filing surface between the file elements.

6. In a filing machine the combination of a frame, a plurality of vertically spaced pulleys supported therefrom, a table positioned between said pulleys, a carrier guided on said pulleys for movement of a portion downwardly in a straight line path providing a working zone above said table, file elements located at the front of said carrier to provide a substantially continuous front filing surface in said path and defined between two parallel laterally spaced vertical planes, fastening means individually fixing said file elements with said carrier, said file elements and carrier providing for each file element a plurality of longitudinally spaced cooperative dowel and recess portions preventing relative lateral movement of the file elements, and means preventing lateral movement of said carrier including a guide engaging lateral faces thereof at a level immediately above said table, said guide at said level being of a lateral width no greater than the spacing of said planes.

7. In a filing machine the combination of a frame, a plurality of vertically spaced pulleys supported therefrom, a table carried by said frame between the pulleys, a carrier guided on said pulleys for movement of a portion downwardly in a straight line path, providing a working zone adjacently above the upper surface of said table, file elements located at the front of said carrier to provide a substantially continuous front filing surface in said path and defined between two parallel laterally spaced vertical planes, the ends of adjacent file elements being mutually overlapping in a longitudinal direction in said straight line path portion, whereby to minimize the effect of the joints between the file elements, and a vertically disposed guide for said carrier and files, said guide extending through said working zone and into said table.

8. In a filing machine the combination of a frame, a plurality of vertically spaced pulleys supported therefrom, a table carried by said frame between the pulleys, a carrier guided on said pulleys for movement of a portion downwardly in a straight line path, providing a working zone adjacently above the upper surface of said table, file elements located at the front of said carrier to provide a substantially continuous front filing surface in said path and defined between two parallel laterally spaced vertical planes, the ends of adjacent file elements being mutually overlapping in a longitudinal direction in said straight line path portion, whereby to minimize the effect of the joints between the file elements, and a vertically disposed guide for said carrier and files extending through said working zone and into said table to prevent displacement of said files, said guide at the upper level of said table being of a lateral width no greater than the spacing of said planes.

9. In a filing machine the combination of a frame, a plurality of vertically spaced pulleys supported therefrom, a table carried by said frame between the pulleys, a carrier guided on said pulleys for movement of a portion downwardly in a straight line path, providing a working zone adjacently above the upper surface of said table, file elements located at the front of said carrier to provide a substantially continuous front filing surface in said path and defined between two parallel laterally spaced vertical planes, the ends of adjacent file elements being mutually overlapping in a longitudinal direction in said straight line path portion so that each may receive pressure of the work before the next preceding element has been relieved of such pressure, whereby to minimize the effect of the joints between the file elements, and a vertically disposed guide for said carrier and files extending through said working zone and into said table to prevent displacement of said files, said guide being unitarily removable and replaceable.

10. In a filing machine the combination of a frame, a plurality of vertically spaced pulleys supported therefrom, a table carried by said frame between the pulleys, a carrier guided on said pulleys for movement of a portion downwardly in a straight line path, providing a working zone adjacently above the upper surface of said table, file elements located at the front of said carrier to provide a substantially continuous front filing surface in said path and defined between two parallel laterally spaced vertical planes, the ends of adjacent file elements being mutually overlapping in a longitudinal direction in said straight line path portion, whereby to minimize the effect of the joints between the file elements, and a vertically disposed guide for said carrier and files extending through said working zone and to said table to prevent lateral displacement of said files, said guide being unitarily removable and replaceable and at the upper level of said table being of a lateral width no greater than said files.

11. In a filing machine the combination of an endless carrier, a series of files attached to said carrier, a horizontal work support, means for advancing said carrier and files downwardly through the working zone and past said support, an element spaced from and disposed above said support, a reaction guide member spanning the space between said element and said support and engaging said carrier, said guide being of a lateral overall width within said working zone no greater than said files, and an adjustable roller coacting with the faces of said files remote from said guide.

12. In a filing machine the combination of an endless carrier, a series of files attached to said carrier, a horizontal work support, means for angularly adjusting said support with respect to said carrier and for maintaining the same in various positions of adjustment, means for advancing said carrier and files downwardly through a working zone and past said support, an element spaced from and disposed above said support, and a reaction guide member for said carrier and files, said member spanning the space between said element and said support and having in said working zone an overall width no greater than said files.

13. In a filing machine the combination of an endless carrier, a series of files attached to said carrier, a pivoted horizontal work support, means for advancing said carrier and files downwardly through a working zone and past said support, an element spaced from and disposed above said support, and a reaction guide member for said carrier and files, said member spanning the space between said element and said support and having in said working zone an overall width no greater than said files, the support for said guide providing for rigidly maintaining the position thereof during pivotal movement of said work support.

14. In a filing machine the combination of an endless carrier chain, a series of files attached to selected links of said chain, a pivoted horizontal work support, means for advancing said chain and files downwardly past said support, an element spaced from and disposed above said support, and a U-shaped reaction guide member engaging said chain and extending along the sides thereof, and contacting the backs of said files, said guide spanning the space between said element and said support, the support for said guide providing for rigidly maintaining the position thereof during pivotal movement of said work support.

15. In a filing machine the combination of an endless carrier, a series of files attached to said carrier, a horizontal work support, means for advancing said carrier and files downwardly through the working zone and past said support, a pair of vertically spaced elements disposed respectively above and below the work supporting surface of said support, and a reaction guide detachably associated with both of said elements and engaging said carrier, said guide in said working zone being of a lateral horizontal overall width no greater than the work engaging faces of said files.

16. In a filing machine the combination of an endless carrier chain, a series of files attached to selected links of said chain, a horizontal work support, means for advancing said chain and files downwardly past said support, a pair of vertically spaced elements disposed respectively above and below the work supporting surface of said support, and a U-shaped reaction guide engaging said chain and extending along the sides thereof, said guide being detachably associated with both of said elements, and of a lateral horizontal width at the upper level of said work support no greater than the work engaging faces of the files.

17. In a filing machine the combination of an endless carrier, a series of files attached to said carrier, a horizontal work support, means for advancing said carrier and files downwardly past said support, a pair of vertically spaced elements disposed respectively above and below the work supporting surface of said support, and a reaction guide having a hook-shaped portion resting upon said upper element and having a lower end coacting freely with the front portion of said lower element, the front portion of said guide engaging the rear of said files.

18. In a filing machine the combination of an endless carrier, a series of files attached to said carrier, a horizontal work support, means for advancing said carrier and files downwardly past said support, a pair of vertically spaced elements disposed respectively above and below the work supporting surface of said support, and a U-shaped reaction guide having a hook-shaped portion resting upon said upper element and having a lower end coacting freely with the front portion of said lower element, the walls of the U-shaped portion of said guide engaging the rear of said files and the sides thereof extending along the opposite sides of said carrier.

19. In a filing machine the combination of an endless carrier, a series of files attached to said carrier, a horizontal work support, means for advancing said carrier and files downwardly through a working zone and past said support, a pair of vertically spaced elements disposed respectively above and below the work supporting surface of said support, a reaction guide having support engagement with the upper of said elements and bearing against the lower of said elements, said guide within said working zone being of a lateral width no wider than said files.

BENJAMIN GROB.
THEODORE GROB.